US012686909B2

(12) United States Patent
Song et al.

(10) Patent No.: US 12,686,909 B2
(45) Date of Patent: Jul. 21, 2026

(54) SURFACE MODIFYING METHOD FOR GALVANIZED STEEL SHEET

(71) Applicant: POSCO CO., LTD, Pohang-si (KR)

(72) Inventors: Yon-Kyun Song, Incheon (KR);
Yun-Ha Yoo, Incheon (KR);
Joong-Chul Park, Incheon (KR);
Hyun-Ju Jeong, Incheon (KR);
Jae-Dong Cho, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/967,731

(22) Filed: Dec. 4, 2024

(65) Prior Publication Data

US 2025/0146116 A1      May 8, 2025

Related U.S. Application Data

(62) Division of application No. 18/019,567, filed as application No. PCT/KR2021/011239 on Aug. 24, 2021, now Pat. No. 12,188,129.

(30) Foreign Application Priority Data

Sep. 8, 2020      (KR) ........................ 10-2020-0114396

(51) Int. Cl.
*C23C 22/53* (2006.01)
*B32B 3/02* (2006.01)
(Continued)

(52) U.S. Cl.
CPC .................. *C23C 2/26* (2013.01); *B32B 3/02* (2013.01); *B32B 15/012* (2013.01);
(Continued)

(58) Field of Classification Search
CPC ........... C23C 22/53; C23C 22/56; C23C 2/26; C23C 2/06; C23C 2/28; C23C 2/40;
(Continued)

(56) References Cited

U.S. PATENT DOCUMENTS 6,022,425 A       2/2000  Nelson et al.
2006/0257682 A1   11/2006 Song
(Continued)

FOREIGN PATENT DOCUMENTS

JP       H10-501303 A      2/1998
JP       2001-158973 A     6/2001
(Continued)

OTHER PUBLICATIONS

Machine Translation, Song KR 10-0742844 B1, Jul. 25, 2007. (Year: 2007).*
(Continued)

*Primary Examiner* — Michael E. La Villa
(74) *Attorney, Agent, or Firm* — Morgan Lewis & Bockius LLP

(57) ABSTRACT

A galvanized steel sheet according to one aspect of the present invention comprises: a base steel sheet; and a Zn—Al—Mg-based plating layer provided on at least one surface of the base steel sheet, wherein the Zn—Al—Mg-based plating layer may include a surface modified region enriched with cerium (Ce) on a surface layer side of the Zn—Al—Mg-based plating layer.

3 Claims, 3 Drawing Sheets

(51) Int. Cl.

| | |
|---|---|
| *B32B 15/01* | (2006.01) |
| *B32B 15/04* | (2006.01) |
| *B32B 15/18* | (2006.01) |
| *B32B 15/20* | (2006.01) |
| *C22C 18/00* | (2006.01) |
| *C22C 18/04* | (2006.01) |
| *C22C 21/10* | (2006.01) |
| *C23C 2/06* | (2006.01) |
| *C23C 2/26* | (2006.01) |
| *C23C 2/28* | (2006.01) |
| *C23C 2/40* | (2006.01) |
| *C23C 22/56* | (2006.01) |
| *C23C 28/00* | (2006.01) |

(52) U.S. Cl.

CPC ........... *B32B 15/013* (2013.01); *B32B 15/04* (2013.01); *B32B 15/043* (2013.01); *B32B 15/18* (2013.01); *B32B 15/20* (2013.01); *C22C 18/00* (2013.01); *C22C 18/04* (2013.01); *C22C 21/10* (2013.01); *C23C 2/06* (2013.01); *C23C 2/28* (2013.01); *C23C 2/40* (2013.01); *C23C 22/53* (2013.01); *C23C 22/56* (2013.01); *C23C 28/30* (2013.01); *C23C 28/321* (2013.01); *C23C 28/3225* (2013.01); *Y10T 428/12396* (2015.01); *Y10T 428/1266* (2015.01); *Y10T 428/12757* (2015.01); *Y10T 428/12799* (2015.01); *Y10T 428/12972* (2015.01); *Y10T 428/12979* (2015.01); *Y10T 428/12993* (2015.01); *Y10T 428/24967* (2015.01); *Y10T 428/26* (2015.01); *Y10T 428/263* (2015.01); *Y10T 428/264* (2015.01); *Y10T 428/265* (2015.01); *Y10T 428/27* (2015.01)

(58) Field of Classification Search

CPC ... C23C 28/30; C23C 28/321; C23C 28/3225; B32B 3/02; B32B 15/012; B32B 15/013; B32B 15/04; B32B 15/043; B32B 15/18; B32B 15/20; C22C 18/00; C22C 18/04; C22C 21/10; Y10T 428/12396; Y10T 428/1266; Y10T 428/12757; Y10T 428/12799; Y10T 428/12972; Y10T 428/12979; Y10T 428/12993; Y10T 428/24967; Y10T 428/26; Y10T 428/263; Y10T 428/264; Y10T 428/265; Y10T 428/27

See application file for complete search history.

(56) References Cited

U.S. PATENT DOCUMENTS

| | | |
|---|---|---|
| 2013/0183541 A1 | 7/2013 | Kim et al. |
| 2013/0316192 A1 | 11/2013 | Stellnberger et al. |
| 2018/0079174 A1 | 3/2018 | Kawamura et al. |
| 2019/0315977 A1 | 10/2019 | Kim et al. |
| 2019/0368007 A1 | 12/2019 | Tokuda et al. |

FOREIGN PATENT DOCUMENTS

| | | | |
|---|---|---|---|
| JP | 2002-241962 | A | 8/2002 |
| JP | 2014-501854 | A | 1/2014 |
| JP | 2014-162957 | A | 9/2014 |
| JP | 2018-150593 | A | 9/2018 |
| KR | 10-0660235 | B1 | 12/2006 |
| KR | 10-2007-0068526 | A | 7/2007 |
| KR | 10-0742844 | B1 | 7/2007 |
| KR | 10-2009-0071162 | A | 7/2009 |
| KR | 10-2012-0075235 | A | 7/2012 |
| KR | 10-1500184 | B1 | 3/2015 |
| KR | 10-2017-0118860 | A | 10/2017 |
| KR | 10-2018-0073855 | A | 7/2018 |
| KR | 10-2019-0102239 | A | 9/2019 |
| TW | 201139732 | A1 | 11/2011 |
| WO | 2011/102537 | A1 | 8/2011 |
| WO | 2016/159307 | A1 | 10/2016 |

OTHER PUBLICATIONS

Office Action dated Jan. 9, 2025, issued in corresponding Chinese Patent Application No. 202180051864.4, with English translation.

Notice of Allowance dated Jan. 28, 2025, issued in corresponding Japanese Patent Application No. 2023-507729, with English translation.

International Search Report dated Dec. 13, 2021 issued in International Patent Application No. PCT/KR2021/011239 (with English translation).

U.S. Notice of Allowance dated Sep. 11, 2024 issued in U.S. Appl. No. 18/019,567.

U.S. Non-Final Office Action dated Jun. 3, 2024 issued in U.S. Appl. No. 18/019,567.

Search Report dated Oct. 24, 2023 issued in European Patent Application No. 21867017.2.

Japanese Office Action dated Nov. 28, 2023 issued in Japanese Patent Application No. 2023-507729.

Machine translation, Shigeaki, JP 2001-158973, Jun. 2001.

* cited by examiner

SURFACE MODIFYING METHOD FOR GALVANIZED STEEL SHEET

CROSS-REFERENCE OF RELATED APPLICATIONS

This application is a Divisional patent application of U.S. patent application Ser. No. 18/019,567, filed on Feb. 3, 2023, which is the U.S. National Phase under 35 U.S. C. § 371 of International Patent Application No. PCT/KR2021/011239, filed on Aug. 24, 2021, which in turn claims the benefit of Korean Application No. 10-2020-0114396, filed on Sep. 8, 2020, the entire disclosures of which applications are incorporated by reference herein.

TECHNICAL FIELD

The present disclosure relates to a plated steel sheet for automobiles, and more particularly, to a magnesium-containing galvanized steel sheet having effectively improved adhesion to a sealer adhesive.

BACKGROUND ART

A plated steel sheet in which zinc or zinc alloy plating is applied to the surface of a steel sheet containing carbon is used as an interior and exterior panel material for automobiles. In detail, in order to improve corrosion resistance, a plated steel sheet to which magnesium (Mg) is added as a plating layer component of a galvanized steel sheet or a zinc alloy plated steel sheet has been commercialized and widely used.

In general, plated steel sheets for automobiles go through processes such as forming, welding, assembling, and the like, and then undergo a process of filling the empty space between the inner and outer plates with an epoxy-based sealer adhesive to reduce noise from the car body. Epoxy-based sealer adhesives swell at about 200° C. or higher during the curing process after painting and thus have porosity, and at this time, the epoxy-based sealer adhesive adheres to the plated steel sheet and may effectively reduce noise and vibrations of the vehicle body.

It is known that there is no particular problem in the adhesion between the epoxy-based sealer adhesive and the plated steel sheet in a typical galvanized steel sheet or zinc alloy plated steel sheet. However, in the zinc alloy plated steel sheet containing magnesium (Mg) as a component of the plating layer, there is a problem in that the adhesion between the sealer adhesive and the plated steel sheet may be inferior due to the magnesium oxide formed on the surface layer of the plating layer. In order to prevent this problem, a method of increasing the contact area by imparting roughness to the surface of the plating layer or a method of increasing chemical bonding strength of the boundary surface by activating and modifying the outermost surface of the plating layer have been proposed. However, these are not evaluated as realistic methods for improving the adhesion between the zinc alloy plating layer containing magnesium (Mg) and the epoxy-based sealer adhesive.

PRIOR ART LITERATURE (Patent Document 1) Korean Patent Publication No. 10-2018-0073855 (published on Jul. 3, 2018)

SUMMARY OF INVENTION

Technical Problem

An aspect of the present disclosure is to provide a surface modifying method of a galvanized steel sheet for improving adhesion between a magnesium-containing galvanized steel sheet and an adhesive, and a magnesium-containing galvanized steel sheet surface-modified accordingly.

The subject of the present disclosure is not limited to the above. A person of ordinary skill in the art will have no difficulty in understanding the further subjects of the present disclosure from the general contents of this specification.

According to an aspect of the present disclosure, a galvanized steel sheet includes a base steel sheet; and a Zn—Al—Mg-based plating layer provided on at least one surface of the base steel sheet, wherein the Zn—Al—Mg-based plating layer includes a surface modification region enriched with cerium (Ce) on a surface layer side of the Zn—Al—Mg-based plating layer.

The surface modification region may include an convex portion provided by zinc-cerium nitrate salt (Zn—Ce—$NO_3$—$H_2O$) attached to a surface layer of the Zn—Al—Mg-based plating layer; and a concave portion provided by removing magnesium (Mg) of the surface layer of the Zn—Al—Mg-based plating layer.

An adhesion amount of the zinc-cerium nitrate salt (Zn—Ce—$NO_3$—$H_2O$) may be 0.01 to 2.5 $g/m^2$.

A surface roughness of the surface modification region may be 1.2-1.6 μm based on a center line average roughness (Ra).

The Zn—Al—Mg-based plating layer may include, by weight %, 0.1 to 16% of magnesium (Mg), 0.1 to 12% of aluminum (Al), 0.0005 to 1.5% of cerium (Ce), remainder zinc (Zn) and unavoidable impurities.

According to an aspect of the present disclosure, a surface modifying method for a galvanized steel sheet includes preparing a galvanized steel sheet having a Zn—Al—Mg-based plating layer formed on at least one surface of a base steel sheet; preparing a aqueous cerium nitrate solution; immersing the galvanized steel sheet in the aqueous cerium nitrate solution; and washing and drying the galvanized steel sheet immersed in the aqueous cerium nitrate solution.

The preparing the galvanized steel sheet may include preparing a Zn—Al—Mg-based plating bath; and forming a plating layer by immersing the base steel sheet in the Zn—Al—Mg-based plating bath, wherein in the preparing the Zn—Al—Mg-based plating bath, a plating bath containing 0.1 to 16% of magnesium (Mg), 0.1 to 12% of aluminum (Al), a remainder of zinc (Zn) and unavoidable impurities by weight % is prepared, cerium (Ce) inevitably added to the plating bath being suppressed to a content of 0.01% or less (including 0%).

In the preparing the aqueous cerium nitrate solution, the aqueous cerium nitrate solution with a pH of 3.2 to 3.8 may be prepared by titrating with nitric acid ($HNO_3$) after dissolving 15 to 25 g of cerium nitrate per 1000 ml of water ($H_2O$).

In the immersing in the aqueous cerium nitrate solution, a temperature of the aqueous cerium nitrate solution may be 20-80° C., and an immersion time of the galvanized steel sheet may be 10 to 150 seconds.

The means for solving the above problems do not enumerate all the features of the present disclosure, and various features of the present disclosure and advantages and effects thereof may be understood in more detail with reference to the detailed embodiments below.

Advantageous Effects of Invention

According to an aspect of the present disclosure, a magnesium-containing galvanized steel sheet having effectively improved adhesion to an adhesive through surface modification treatment may be provided.

According to another aspect of the present disclosure, a surface modifying method for a galvanized steel sheet capable of effectively improving the adhesion between a magnesium-containing galvanized steel sheet and an adhesive may be provided.

The effect of the present disclosure is not limited to the above, and it may be interpreted as including technical effects that those skilled in the art may infer from the matters described below.

BEST MODE FOR INVENTION

Figures 1A, 1B:
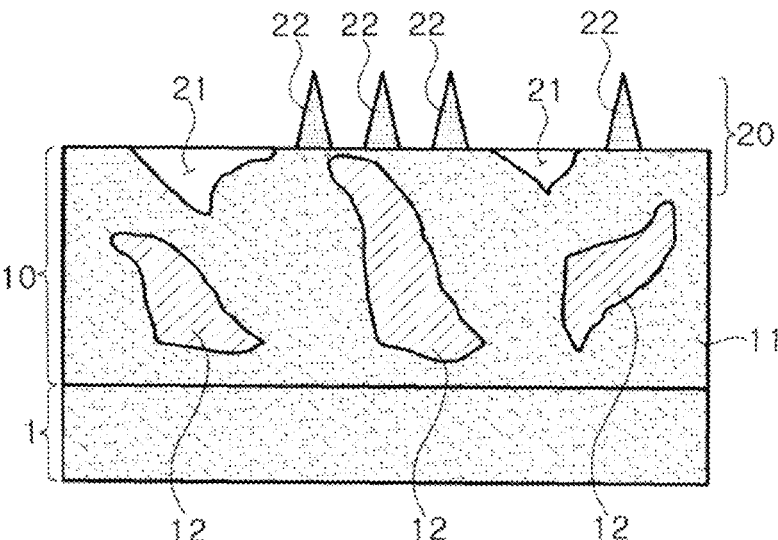
FIGS. 1(*a*) and 1(*b*) are schematic diagrams schematically illustrating the concept of the surface modification treatment of the present disclosure, and FIG. 1 (*a*) is a diagram schematically illustrating a cross section of the plating layer before the surface modification treatment, and FIG. 1 (*b*) is a diagram schematically illustrating a cross section of the plating layer after the surface modification treatment.

The present disclosure relates to a surface modifying method for a galvanized steel sheet and to a galvanized steel sheet surface-modified accordingly. Hereinafter, preferred embodiments of the present disclosure will be described. Embodiments of the present disclosure may be modified in various forms, and it should not be construed that the scope of the present disclosure is limited to the embodiments described below. The present embodiments are provided in order to describe in more detail the present disclosure to those of ordinary skill in the art to which the present disclosure pertains.

Hereinafter, a galvanized steel sheet according to an embodiment of the present disclosure will be described in more detail.

The galvanized steel sheet of the present disclosure may include a base steel sheet; and a Zn—Al—Mg-based plating layer provided on at least one surface of the base steel sheet.

The base steel sheet is not particularly limited, and may be interpreted as a concept including all steel sheets applicable to the manufacture of a galvanized steel sheet in general. As an example, the base steel sheet of the present disclosure may be interpreted as a concept including a wire rod and a steel wire as well as a cold rolled steel sheet, a hot rolled steel sheet and a heat-treated steel sheet. In addition, the base steel sheet of the present disclosure is not particularly limited with respect to the alloy composition, microstructure, and the like. Preferably, the base steel sheet of the present disclosure may be a low carbon steel cold rolled steel sheet having a carbon (C) content of 0.05 wt % or less, but is not necessarily limited thereto.

Hereinafter, the plating layer of the present disclosure will be described in more detail. Hereinafter, unless otherwise indicated, % described in relation to the alloy composition of the plating layer means weight %.

As for the plating layer of this invention, the formation method is not specifically limited. As an example, the plating layer of the present disclosure may be formed by a hot-dip plating method, an electroplating method, a vacuum deposition plating method, etc. and may also be formed by the plating layer formation method accompanying an alloying process. Preferably, the plating layer of the present disclosure may be a zinc-based hot-dip plated layer, and more preferably, the plating layer of the present disclosure may be a Zn—Al—Mg-based hot-dip plated layer.

The plating layer of the present disclosure may be a Zn—Al—Mg-based plating layer containing 0.1 to 16% of magnesium (Mg), 0.1 to 12% of aluminum (Al), the remainder of zinc (Zn) and unavoidable impurities by weight %. In addition, the plating layer of the present disclosure may further include 0.0005 to 1.5 wt % of cerium (Ce) as a component that is not artificially added to the plating bath, but is introduced into the plating layer through surface modification treatment.

Magnesium (Mg), aluminum (Al) and zinc (Zn) form a liquid molten-aluminum-magnesium alloy of uniform composition in a ternary process reaction in a plating bath. Liquid zinc-aluminum-magnesium is coated on the surface of the steel strip that has passed through the ternary plating bath. As the liquid zinc-aluminum-magnesium cools in the atmosphere, the liquid zinc-aluminum-magnesium may be formed of Zn single-phase structure containing 1-4% aluminum (Al), Mg single-phase structure containing 1-2% zinc (Zn), $MgZn_2$ single-phase structure, Zn—$MgZn_2$ binary eutectic structure, Zn—Al binary eutectic structure and $MgZn_2$—Zn—Al ternary eutectic structure. Such intermetallic compounds (single phase structure, binary eutectic structure, ternary eutectic structure) may be composed of two or more types in the plating layer depending on the composition range of the components in the plating bath, the plating bath temperature and the cooling rate.

Magnesium (Mg) in the plating layer reacts before zinc (Zn) when exposed to the atmosphere to form magnesium hydroxide, and thus serves to effectively improve the corrosion resistance of the plated steel sheet. In particular, magnesium (Mg) is mainly present as $MgZn_2$ single-phase structure, but is present within a binary process organization or a ternary process organization, or may also be present as an Mg single phase structure containing 1 to 2% of zinc (Zn). On the surface layer side of the plating layer, mainly $MgZn_2$ single-phase structure exists as a layer, and therefore, the corrosion resistance of the plated steel sheet may be improved more effectively. Therefore, the Zn—Al—Mg-based plating layer of the present disclosure may contain 0.1 wt % or more of magnesium (Mg). Preferably, it may contain 0.5% or more of magnesium (Mg), and more preferably, it may contain 1.0 wt % or more of magnesium (Mg).

However, if the content of magnesium (Mg) is excessive, the effect of improving corrosion resistance is not only saturated, and magnesium (Mg) oxide-related dross may be formed in the plating bath, which may deteriorate plating properties. An excessive amount of magnesium hydroxide is formed in the surface layer portion of the plating layer, so that the adhesion with the epoxy-based sealer adhesive may be poor even by the surface modification treatment. In addition, too much Zn—Al—Mg-based intermetallic compound having a high hardness is formed in the microstructure of the plating layer, and there is a possibility that the bendability may be deteriorated. Accordingly, the Zn—Al—Mg-based plating layer of the present disclosure may contain 16 wt % or less of magnesium (Mg). Preferably, it may contain 12 wt % or less of magnesium (Mg), and more preferably, it may contain 8 wt % or less of magnesium (Mg).

Aluminum (Al) causes a process reaction with zinc (Zn) and magnesium (Mg) in the plating bath to facilitate alloying, and the intermetallic compound containing aluminum (Al) formed during the solidification process acts as a corrosion barrier and may effectively contribute to the improvement of corrosion resistance. In addition, aluminum (Al) suppresses the formation of magnesium (Mg)-based oxide dross to form a sufficient amount of Zn—Al—Mg-based intermetallic compound in the plating layer, thereby effectively contributing to the improvement of the corrosion resistance of the plated steel sheet. Accordingly, the Zn—Al—Mg-based plating layer of the present disclosure may contain 0.1 wt % or more of aluminum (Al). Preferably, it may contain 0.5% by weight or more of aluminum (Al), and more preferably, it may contain 1.0% or more of aluminum (Al). However, if the content of aluminum (Al) is excessive, the effect of improving corrosion resistance is not only saturated, but also the plating bath temperature should be increased, and the vapor gas of magnesium (Mg) and zinc (Zn) generated at this time may adversely affect the durability of the plating device. Furthermore, an excessively large amount of a Zn—Al—Mg-based intermetallic compound having high hardness is formed in the microstructure of the plating layer, and there is a concern that bendability may deteriorate. Therefore, the Zn—Al—Mg-based plating layer of the present disclosure may contain 12 wt % or less of aluminum (Al). Preferably, it may contain 9 wt % or less of aluminum (Al), more preferably, 6 wt % or less of aluminum (Al).

The Zn—Al—Mg-based plating layer of the present disclosure may include a remainder of zinc (Zn) and unavoidable impurities in addition to the aforementioned magnesium (Mg) and aluminum (Al). Here, the unavoidable impurities may mean a component that is unavoidably introduced in the manufacturing process of the plated steel sheet or a component that flows from the base steel sheet, and even when there is no detailed limitation on the unavoidably introduced components, those skilled in the art may easily understand these components.

The Zn—Al—Mg-based plating layer of the present disclosure may further include 0.0005 to 1.5 wt % of cerium (Ce). Cerium (Ce) contained in the Zn—Al—Mg-based plating layer of the present disclosure is not an artificially added component in the plating bath composition, and may be introduced as a component of the Zn—Al—Mg-based plating layer by the surface modification treatment performed after the formation of the plating layer. In order to secure the required sealer adhesion, the content of cerium (Ce) flowing into the Zn—Al—Mg-based plating layer of the present disclosure may be limited to 0.0005 wt % or more. Preferably, the inflow of cerium (Ce) may be limited to 0.001 wt % or more, and more preferably, the inflow amount of cerium (Ce) may be limited to 0.005 wt % or more. However, if the content of cerium (Ce) flowing into the Zn—Al—Mg-based plating layer is excessive, while the effect of improving the sealer adhesion is saturated, cerium (Ce) is precipitated at the grain boundary of the Zn—Al—Mg-based intermetallic compound, and thus, mechanical properties such as impact resistance and abrasion resistance may be inferior. Therefore, the present disclosure may limit the content of cerium (Ce) flowing into the Zn—Al—Mg-based plating layer to 1.5 wt % or less. Preferably, the inflow amount of cerium (Ce) may be limited to 1.2 wt % or less, and more preferably, the inflow amount of cerium (Ce) may be limited to 1.0 wt % or less.

The Zn—Al—Mg-based plating layer of the present disclosure may have a microstructure included in a conventional Zn—Al—Mg-based plating layer. As an example, the Zn—Al—Mg-based plating layer of the present disclosure may include, as a microstructure, one or more selected from the group consisting of a Zn single-phase structure containing 1-4% aluminum (Al), a Mg single-phase structure containing 1-2% zinc (Zn), a $MgZn_2$ single-phase structure, a Zn—$MgZn_2$ binary eutectic structure, a Zn—Al binary eutectic structure and a $MgZn_2$—Zn—Al ternary eutectic structures, and other tissues that are unavoidably introduced during the manufacturing process.

The surface layer portion of the Zn—Al—Mg-based plating layer of the present disclosure may include a surface modification region introduced through surface modification treatment, and a large amount of cerium (Ce) may be concentrated in the surface modification region compared to the center of the Zn—Al—Mg-based plating layer. As will be described later, since in the present disclosure, the surface modification treatment of the plating layer is performed using an aqueous cerium nitrate solution, a zinc-cerium nitrate salt (Zn—Ce—$NO_3$—$H_2O$) may be attached to the surface of the plating layer. Therefore, a surface modification region in which a certain amount or more of cerium (Ce) is concentrated on the surface layer may be formed.

FIGS. 1(a) and 1(b) are schematic diagrams schematically illustrating the concept of the surface modification treatment of the present disclosure, FIG. 1(a) illustrates a cross section of the plating layer before the surface modification treatment, and FIG. 1(b) schematically shows a cross section of the plating layer after the surface modification treatment. In FIG. 1 (b), in order to explain the concept of the surface modification treatment of the present disclosure, the shape of the concave portion and the convex portion is slightly exaggerated, but it is necessary to note that the shape of the concave portion and the convex portion of the present disclosure is not necessarily limited to the shape illustrated in FIG. 1(b).

As illustrated in FIG. 1(a), in the Zn—Al—Mg-based plating layer 10 formed on the base steel sheet 1, a Zn single-phase structure 11, a Zn—Mg—Al-based intermetallic compound 12, and a $MgZn_2$ single-phase structure 13 are mixed, and thereamong, the $MgZn_2$ single-phase structure 13 containing a large amount of magnesium (Mg) having strong oxidation is mainly distributed on the surface layer side of the plating layer 10. Since the magnesium (Mg) component of the $MgZn_2$ single-phase structure 13 distributed in the surface layer of the Zn—Al—Mg-based plating layer 10 reacts with moisture ($H_2O$) in the air to first form magnesium hydroxide, it may act as a factor to reduce the adhesion between the plating layer 10 and the epoxy-based sealer.

As illustrated in FIG. 1(b), in the surface layer portion of the Zn—Al—Mg-based plating layer 10 that has been subjected to surface modification treatment using an aqueous cerium nitrate solution, a surface modification region 20 having an uneven shaped surface may be provided. Magnesium (Mg) on the surface side of the plating layer 10 reacts with the nitric acid of the aqueous cerium nitrate solution and is eluted as the aqueous solution, and therefore, the corresponding region may be formed as a concave portion 21. On the other hand, since zinc (Zn) on the surface side of the plating layer 10 reacts with cerium (Ce) in the aqueous cerium nitrate solution to form zinc-cerium nitrate salt (Zn—Ce—$NO_3$—$H_2O$), the region to which zinc-cerium nitrate salt ($Zn$—$Ce$—$NO_3$—$H_2O$) is attached may be formed as a convex portion 22. That is, since the surface modification region 20 having an uneven surface is formed in the surface layer portion of the $Zn$—$Al$—$Mg$-based plating layer 10 that has been subjected to the surface modification treatment, the physical contact area may be increased when bonding with an epoxy-based sealer adhesive. In addition, zinc-cerium nitrate salt ($Zn$—$Ce$—$NO_3$—$H_2O$) increases chemical bonding strength when bonding with an epoxy-based sealer adhesive, thereby more effectively improving the adhesion between the plating layer 10 and the epoxy-based sealer adhesive.

It is preferable that the adhesion amount of zinc-cerium nitrate salt ($Zn$—$Ce$—$NO_3$—$H_2O$) is at a level of 0.01 to 2.5 $g/m^2$. This is because when the adhesion amount of the zinc-cerium nitrate salt ($Zn$—$Ce$—$NO_3$—$H_2O$) is less than 0.01 $g/m^2$, the required effect of improving adhesion cannot be sufficiently expected. More preferably, the adhesion amount of zinc-cerium nitrate salt ($Zn$—$Ce$—$NO_3$—$H_2O$) may be 0.1 $g/m^2$ or more. In addition, as the adhesion amount of zinc-cerium nitrate salt ($Zn$—$Ce$—$NO_3$—$H_2O$) increases, the adhesive force with the epoxy-based sealer adhesive tends to increase, but if it is a certain level or more, the effect is not only saturated, but also may cause painting defects such as blisters, pinholes, etc. in the subsequent painting process, and the adhesion amount of zinc-cerium nitrate salt ($Zn$—$Ce$—$NO_3$—$H_2O$) may thus be managed at a level of 2.5 $g/m^2$ or less.

The surface roughness of the surface modification region may be in the range of 1.2 to 1.6 μm based on the center line average roughness (Ra). If the surface roughness of the surface modification region does not reach a certain level, since it means that the surface uneven shape of the surface modification region is not formed to the required level, the present disclosure may limit the surface roughness of the surface modification region to 1.2 μm or more based on the center line average roughness (Ra). In addition, if the surface roughness of the surface modification region exceeds a certain level, the adhesive force may be inferior as the effective contact area is rather small, and in the present disclosure, the surface roughness of the surface modification region may thus be limited to a range of 1.6 μm or less based on the center line average roughness (Ra).

Hereinafter, a surface modifying method for a galvanized steel sheet according to another embodiment of the present disclosure will be described in more detail.

A surface modifying method for a galvanized steel sheet of the present disclosure may include preparing a galvanized steel sheet having a $Zn$—$Al$—$Mg$-based plating layer formed on at least one surface of a base steel sheet; preparing a aqueous cerium nitrate solution; immersing the galvanized steel sheet in the aqueous cerium nitrate solution; and washing and drying the galvanized steel sheet immersed in the aqueous cerium nitrate solution.

The operation of preparing the galvanized steel sheet includes preparing a $Zn$—$Al$—$Mg$-based plating bath; and forming a plating layer by immersing the base steel sheet in the $Zn$—$Al$—$Mg$-based plating bath, and in the operation of preparing the $Zn$—$Al$—$Mg$-based plating bath, a plating bath containing 0.1 to 16% of magnesium (Mg), 0.1 to 12% of aluminum (Al), a remainder of zinc (Zn) and unavoidable impurities by weight % is prepared, and cerium (Ce) inevitably added to the plating bath may be suppressed to a content of 0.01% or less (including 0%).

Since the base steel sheet provided in the surface modifying method of the present disclosure corresponds to the base steel sheet of the plated steel sheet described above, the description of the base steel sheet provided in the surface modifying method is to be replaced with the description of the base steel sheet of the plated steel sheet described above. In addition, since the composition of the $Zn$—$Al$—$Mg$-based plating bath provided in the surface modifying method of the present disclosure corresponds to the composition of the plating layer of the plated steel sheet described above, except that cerium (Ce) is not artificially added, the composition of the $Zn$—$Al$—$Mg$-based plating bath provided in the surface modifying method will be replaced with the description of the composition of the plating layer of the plated steel sheet described above. In addition, the plating conditions such as the plating bath temperature and the base steel sheet temperature during immersion in the plating bath use the normal $Zn$—$Al$—$Mg$-based plating conditions, even if there is no special explanation thereto, a person skilled in the art may prepare the $Zn$—$Al$—$Mg$-based plating bath of the present disclosure without imposing special technical means, and form a desired plating layer.

In the operation of preparing the aqueous cerium nitrate solution, after dissolving 15 to 25 g of cerium nitrate per 1000 ml of water ($H_2O$), an aqueous cerium nitrate solution with a pH of 3.2 to 3.8 may be prepared by titrating with nitric acid ($HNO_3$). For a desired level of surface modification reactivity, the dissolved amount of cerium nitrate per 1000 ml of water ($H_2O$) may be 15 g or more. However, if the amount of cerium nitrate dissolved is excessive, since sludge is likely to be generated, the amount of cerium nitrate dissolved per 1000 ml of water ($H_2O$) may be limited to 25 g or less. If the pH of the aqueous cerium nitrate solution is excessively low, since the etching of the plating layer proceeds faster than the formation of the cerium (Ce)-based coating layer and the surface modification may proceed slowly, the pH of the aqueous cerium nitrate solution may be limited to 3.2 or higher. However, if the pH of the aqueous cerium nitrate solution is excessively high, the etching rate and the surface modification rate of the plating layer are slowed, and the pH of the aqueous cerium nitrate solution may thus be limited to 3.8 or less.

In addition, in the operation of immersion in the aqueous cerium nitrate solution, the temperature of the aqueous cerium nitrate solution may be 20-80° C., and the immersion time of the galvanized steel sheet may be 10-150 seconds. If the temperature of the aqueous cerium nitrate solution is excessively low or the immersion time of the galvanized steel sheet is excessively short, since the desired level of surface modification is not obtained, the temperature of the aqueous cerium nitrate solution may be limited to 20° C. or more, and the immersion time of the galvanized steel sheet may be limited to 10 seconds or more. If the temperature of the aqueous cerium nitrate solution is excessively high or the immersion time of the galvanized steel sheet is excessively long, since it may be difficult to work due to the generation of fume, the temperature of the aqueous cerium nitrate solution may be limited to 80° C. or less, and the immersion time of the galvanized steel sheet may be limited to 150 seconds or less.

The magnesium-containing galvanized steel sheet having been subjected to surface modification treatment using the surface modifying method of the present disclosure may effectively improve adhesion with an epoxy-based sealer adhesive while maintaining the effect of improving corrosion resistance by adding magnesium.

Mode for Invention

Hereinafter, the present disclosure will be described in more detail through examples. However, it is necessary to note that the following examples are only for explaining the present disclosure in more detail, and the scope of the present disclosure is not limited to the following examples.

EXAMPLE

Low-carbon steel with a carbon content of 0.05 wt % or less was cut into 75×150 mm (thickness 0.8 mm), degreased with acetone, and then immersed in a molten Zn—Al—Mg-based plating bath to prepare a Zn—Al—Mg-based alloy plated steel sheet (plating layer thickness: 20 μm) as a specimen. At this time, two specimens under the same conditions were prepared to form a pair, and the conditions of Table 1 were applied to the composition of the molten Zn—Al—Mg-based plating bath.

20 g of cerium nitrate powder was dissolved in 1000 ml of water ($H_2O$) and then titrated with nitric acid ($HNO_3$) to prepare an aqueous cerium nitrate solution having a pH of 3.5. Then, each specimen was immersed in the prepared aqueous cerium nitrate solution, washed with water and dried to perform a surface modification treatment. At this time, the temperature of the aqueous cerium nitrate solution was maintained at 50° C., and the conditions of Table 1 were applied for the immersion time of each specimen.

Figure 2A:
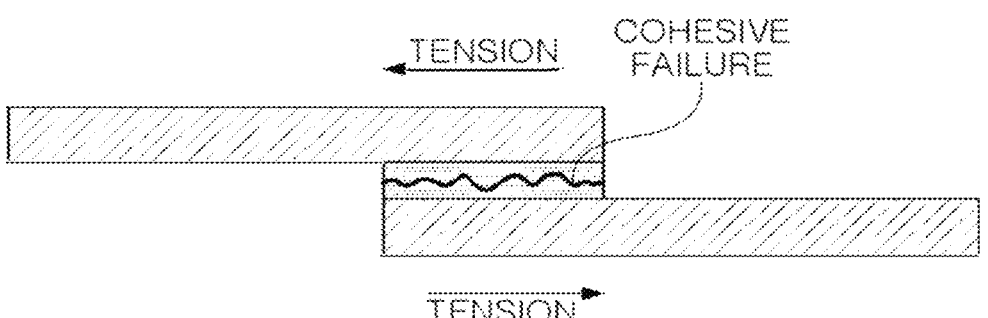
FIGS. 2 (*a*) and (*b*) are diagrams schematically illustrating the concepts of cohesive failure and interfacial failure, respectively.
Figure 2B:
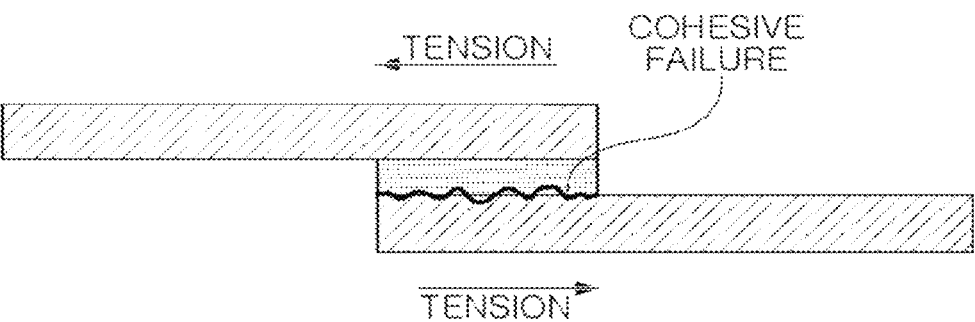
Figure 3A:
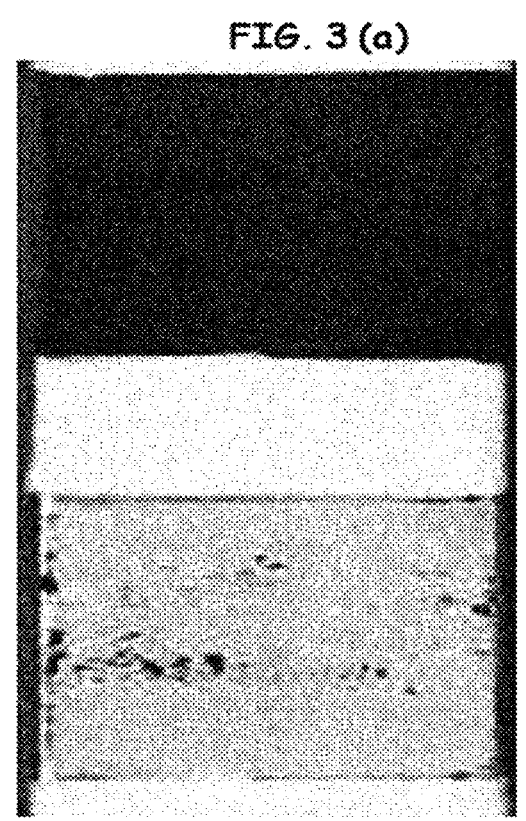
FIGS. 3 (*a*) and (*b*) are photographs provided by observing the bonding surface of cohesive failure and the bonding surface of interfacial failure, respectively.
Figure 3B:
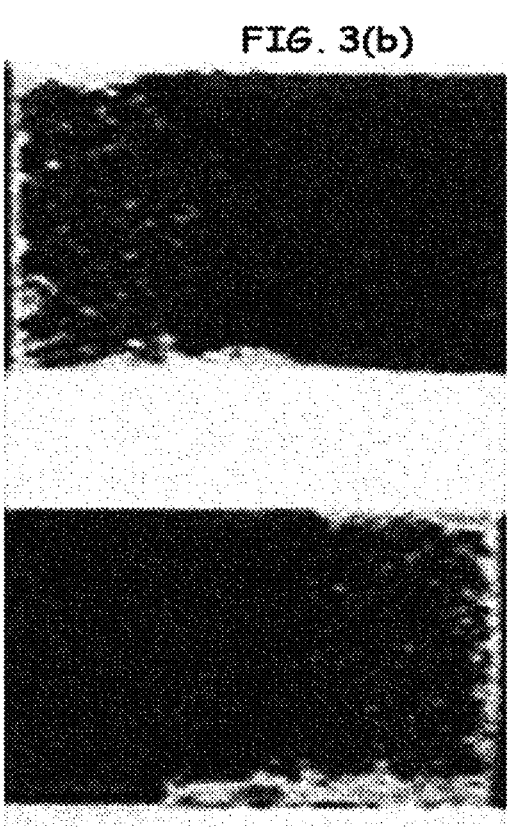

After the surface modification treatment, the sealer adhesion to each specimen was evaluated. For each pair of specimens, an epoxy-based sealer adhesive (766MD by Sunrise Co.) was applied to the area of 15×15 mm and adhered, followed by release and curing at a temperature of 200° C. for 2 minutes. A shear stress of 20 MPa was applied to a pair of foam-hardened bonded specimens in a direction parallel to the sealer adhesion surface to separate the same into individual specimens, and the sealer adhesion was evaluated by observing the separated adhesion surfaces. FIGS. 2 (a) and (b) are diagrams schematically illustrating the concepts of cohesive failure and interfacial failure, respectively. At this time, the sealer adhesion was evaluated based on the area ratio of the epoxy-based sealer adhesive remaining on the adhesive surfaces of both specimens. That is, a case in which the area where the epoxy-based sealer adhesive is applied on all the adhesive surfaces of the separated specimens is 95% or more was evaluated as cohesive failure (very excellent, ⊚), a case in which the area where the epoxy-based sealer adhesive is applied on any one of the adhesive surfaces of the separated specimen is 80% or more was evaluated as quasi-cohesive failure (excellent, ○), and a case in which the area where the epoxy-based sealer adhesive is applied to any one of the adhesive surfaces of the separated specimen is less than 80% was evaluated as interfacial failure (insufficient, X). The area ratio of the epoxy-based sealer adhesive illustrated in Table 1 below refers to the application area of the epoxy-based sealer adhesive observed on the adhesive surface of each specimen separated from the pair of specimen assembly. In FIGS. 3 (a) and (b), the relatively darkest area is the portion where the epoxy-based sealer adhesive is applied, and the grayish white area is the base steel 5 sheet portion.

TABLE 1

| Speci-men No. | Plating bath composition (wt %) | Surface modi-fication solution immersion time (seconds) | Illumi-nance (Ra: μm) | Area ratio of epoxy-based sealer adhesive remaining on adhesive surface of each specimen (%) | Zinc-cerium nitrate salt adhesion amount (g/m$^2$) | Remark |
|---|---|---|---|---|---|---|
| 1 | 100 Zn | not performed | 1.2 | 100-100 | 0 | ⊚ |
| 2 | Zn-1.5 Al-1.5 Mg | not performed | 1 | 50-60 | 0 | X |
| 3 | Zn-1.5 Al-1.5 Mg | not performed | 1 | 60-70 | 0 | X |
| 4 | Zn-1.5 Al-3.0 Mg | 10 | 1.3 | 60-80 | 0.9 | ○ |
| 5 | Zn-1.5 Al-3.0 Mg | 30 | 1.3 | 60-85 | 1.5 | ○ |
| 6 | Zn-1.5 Al-3.0 Mg | 60 | 1.5 | 70-90 | 2.0 | ○ |
| 7 | Zn-1.5 Al-3.0 Mg | 120 | 1.6 | 100-100 | 2.0 | ⊚ |
| 8 | Zn-1.5 Al-3.0 Mg | 150 | 1.6 | 100-100 | 2.5 | ⊚ |
| 9 | Zn-1.5 Al-1.5 Mg | 120 | 1.5 | 100-100 | 2.5 | ⊚ |
| 10 | Zn-1.5 Al-5.0 Mg | 120 | 1.5 | 100-100 | 2.5 | ⊚ |
| 11 | Zn-6.0 Al-6.0 Mg | 120 | 1.5 | 100-100 | 2.6 | ⊚ |

As illustrated in Table 1, it can be seen that specimens No. 4 to No. 11 satisfying the surface modification conditions of the present disclosure have excellent or very excellent sealer adhesion, whereas specimen No. 2 and No. 3 that do not satisfy the surface modification conditions of the present disclosure have poor grade of sealer adhesion.

Although the present disclosure has been described in detail through examples above, other types of embodiments are also possible. Therefore, the spirit and scope of the claims set forth below are not limited to the embodiments.

DESCRIPTION OF REFERENCE CHARACTERS

1: BASE STEEL SHEET
10: PLATING LAYER
11: ZN SINGLE-PHASE STRUCTURE
12: ZN-MG-AL-BASED INTERMETALLIC COMPOUND
13: $MgZn_2$ SINGLE-PHASE STRUCTURE
20: SURFACE MODIFICATION REGION
21: CONCAVE PORTION
22: CONVEX PORTION

The invention claimed is:

1. A surface modifying method for a galvanized steel sheet, comprising:

a first step of preparing a galvanized steel sheet having a Zn—Al—Mg-based plating layer on at least one surface of a base steel sheet;

a second step of preparing an aqueous cerium nitrate solution by dissolving 15 to 25 g of cerium nitrate per 1000 ml of water ($H_2O$) and adjusting the pH to 3.2 to 3.8 by titrating with nitric acid ($HNO_3$);

a third step of immersing the galvanized steel sheet in the aqueous cerium nitrate solution; and a fourth step of washing and drying the galvanized steel sheet that has been immersed in the aqueous cerium nitrate solution.

2. The surface modifying method for a galvanized steel sheet of claim 1, wherein the first step of preparing the galvanized steel sheet comprises:

preparing a Zn—Al—Mg-based plating bath; and forming a plating layer by immersing the base steel sheet in the Zn—Al—Mg-based plating bath;

wherein the Zn—Al—Mg-based plating bath comprises 0.1 to 16 wt % magnesium (Mg), 0.1 to 12 wt % aluminum (Al), the remainder zinc (Zn) and unavoidable impurities; and wherein the cerium (Ce) content in the Zn—Al—Mg-based plating bath is 0.01 wt % or less, including 0 wt %.

3. The surface modifying method for a galvanized steel sheet of claim 1, wherein the third step of immersing the galvanized steel sheet in the aqueous cerium nitrate solution is performed at a temperature of 20 to 80° C., and wherein the immersion time is 10 to 150 seconds.

* * * * *